United States Patent [19]

Hines

[11] Patent Number: 5,301,500
[45] Date of Patent: Apr. 12, 1994

[54] GAS TURBINE ENGINE FOR CONTROLLING STALL MARGIN

[75] Inventor: William R. Hines, Montgomery, Ohio

[73] Assignee: General Electric Company, Cincinnati, Ohio

[21] Appl. No.: 550,271

[22] Filed: Jul. 9, 1990

[51] Int. Cl.$^5$ .............................. F02C 3/04; F02C 7/00
[52] U.S. Cl. ................... 60/39.161; 60/39.5; 415/148
[58] Field of Search ............... 60/39.03, 39.161, 39.29, 60/39.33, 242, 39.5; 415/148, 149.2, 149.4

[56] References Cited

U.S. PATENT DOCUMENTS

| | | | |
|---|---|---|---|
| 2,529,973 | 11/1950 | Sedille et al. | 60/39.161 |
| 2,873,576 | 2/1959 | Lombard | 60/35.6 |
| 2,931,168 | 4/1960 | Alexander et al. | 60/39.29 |
| 3,021,668 | 2/1962 | Longstreet | 60/35.6 |
| 3,041,822 | 7/1962 | Embree | 60/35.6 |
| 3,243,596 | 3/1966 | Loft | 290/40 |
| 3,255,586 | 6/1966 | Hennig et al. | 60/39.03 |
| 3,472,027 | 10/1969 | Snow et al. | 60/236 |
| 3,523,423 | 8/1970 | Young | 60/242 |
| 3,859,785 | 1/1975 | Leto et al. | 60/39.33 |
| 3,924,141 | 12/1975 | Yannone et al. | 290/40 |
| 3,998,047 | 12/1976 | Walker | 60/39.03 |
| 4,163,336 | 5/1979 | Frutschi | 60/39.03 |
| 4,206,593 | 6/1980 | Su et al. | 60/39.04 |
| 4,398,865 | 8/1983 | Garkusha et al. | 415/148 |
| 4,529,887 | 7/1985 | Johnson | 290/40 R |
| 4,624,104 | 11/1986 | Stroem | 60/39.75 |
| 4,631,914 | 12/1986 | Hines | 60/39.05 |
| 4,896,499 | 1/1990 | Rice | 60/39.161 |

FOREIGN PATENT DOCUMENTS 1316723  5/1973  United Kingdom ............ 60/39.161

OTHER PUBLICATIONS

Shepherd, D. G. *Introduction to the Gas Turbine* Constable & Co., London; 1960. p. 57.

Primary Examiner—Louis J. Casaregola
Attorney, Agent, or Firm—Jerome C. Squillaro; James P. Davidson

[57] ABSTRACT

An industrial gas turbine engine includes in serial flow relationship a booster compressor, core engine, power turbine, and flow channel, with the power turbine having a first shaft, joined to the booster compressor, and an output shaft, and the flow channel having an outlet. Means for selectively varying flow area of the channel outlet are provided for controlling stall margin of the booster compressor in an exemplary embodiment of the engine and method of operation. The flow area varying means is effective for providing a minimum area of the channel outlet for controlling booster compressor stall margin at least at a synchronous speed associated with powering an electrical generator. In one embodiment, the flow area varying means effects a minimum horsepower from the output shaft for allowing lock-on and lock-off of the electrical generator at synchronous speed. In another embodiment of the invention, the flow area varying means is effective for braking the electrical generator during a full power stopcock rollback.

21 Claims, 3 Drawing Sheets

GAS TURBINE ENGINE FOR CONTROLLING STALL MARGIN

TECHNICAL FIELD

The present invention relates generally to gas turbine engines, and, more specifically, to aircraft gas turbine engines adapted for land-based and marine applications.

BACKGROUND ART

Marine and land-based industrial (M & I) gas turbine engines are frequently derived from engines designed for and used in various types of aircraft. Such M & I gas turbine engines are used, for example, for powering marine vessels, electrical generators, and various types of pumps.

The parent gas turbine engine of an M & I engine is typically designed and constructed to be lightweight and to operate at minimum specific fuel consumption (SFC) in an aircraft for predetermined thermodynamic cycles of operation having predetermined ranges of air and combustion gas flow rates, temperature, and pressure in the engine.

Development of an aircraft gas turbine engine requires a substantial amount of design, development, and testing resulting in substantial development costs. In designing gas turbine engines for marine and industrial applications, it has proven to be more cost effective to modify an existing aircraft gas turbine engine in the desired power class, than to design the M & I engine from the beginning. Accordingly, it is desirable to minimize the changes in the aircraft engine required for obtaining a suitable M & I engine. One application of an M & I engine is to provide output shaft horsepower for powering an electrical generator to provide electrical power to a utility electrical power grid, or network, for either meeting base load demands, or peaking demands greater than the base load. One goal in providing electrical power is to generate the required power during base load or peaking operation as efficiently as possible for reducing kilowatt-hour costs.

One factor in obtaining relatively low kilowatt-hour costs is the development cost for providing an industrial gas turbine engine for meeting the required power demands. In order to keep development costs relatively low, the industrial gas turbine engine typically utilizes the parent aircraft gas turbine engine and makes as few changes in the design thereof as practical for obtaining the desired land-based gas turbine engine. Accordingly, the parent aircraft gas turbine engine utilized for M & I applications may be adapted specifically for particular applications, including, for example, driving an electrical generator at a synchronous speed, such as 3000 rpm or 3600 rpm, for generating electricity at 50 Hertz or 60 Hertz, respectively.

One type of gas turbine engine used for powering an electrical generator includes two rotors. More specifically, the engine includes in serial flow relationship a conventional booster compressor, core engine, and power turbine having an output shaft connectable to the electrical generator. The power turbine also includes a first shaft, or rotor, joined to the booster compressor, and the core engine includes a conventional high-pressure compressor (HPC) joined to a conventional high-pressure turbine (HPT) by a second shaft, or rotor. The first and second shafts rotate independently of each other but are predeterminedly controlled for conventionally matching fluid flow rates between the booster compressor and the core engine, for example. Such an industrial gas turbine engine may be conventionally derived from an aircraft gas turbine engine by eliminating the conventional fan disposed upstream of the booster compressor in the aircraft gas turbine engine, and modifying the booster compressor, for example by modifying the first few rotor stages thereof as is conventionally known for use in powering an electrical generator. Downstream of the power turbine, a conventional industrial exhaust assembly is provided for discharging the combustion gases from the power turbine to the atmosphere.

In operation for powering an electrical generator, the industrial engine must be operated first for bringing the rotational speed of the power turbine and output shaft to the required synchronous speed, for example 3600 rpm, before the generator may be electrically connected or locked-on to the electrical power grid which will then conventionally maintain the generator and the power turbine at that speed, i.e. synchronous speed. However, the parent engine was initially designed for providing substantial horsepower from the power turbine at that synchronous speed for powering the fan, which was removed for this industrial application, which provided substantial thrust for powering the aircraft in which the engine was utilized.

For example, one such dual rotor industrial engine for powering an electrical generator is configured for obtaining about 56000 maximum shaft horsepower from the output shaft for operating an electrical generator at a full electrical power, on-line synchronous running condition. At part power, on-line synchronous running condition, the minimum output shaft horsepower at which the power turbine may operate in this exemplary embodiment, is about 6800 shaft horsepower. This relatively low value of output shaft horsepower is obtainable by closing to their fullest extent, i.e. about 40° closed, conventional booster variable inlet guide vanes (VIGVS) disposed upstream of the booster compressor which controls inlet airflow to the booster compressor. And, conventional booster variable bleed valves (VBVs) disposed at the discharge of the booster compressor are positioned in a fully open position for bleeding overboard a portion of the air compressed by the booster compressor. In this way, the flow rate of the compressed airflow to the core engine is substantially reduced for minimizing the output shaft horsepower. However, at the 6800 output shaft horsepower condition, the electrical generator prior to being locked-on does not provide a corresponding amount of load for accommodating that amount of output shaft horsepower. Thusly, lock-on at the required synchronous speed cannot be obtained. Furthermore, without suitable means for allowing lock-off from the power grid, the power turbine would reach undesirable overspeed conditions.

Accordingly, the parent aircraft engine could be further modified by replacing the original VBVs with suitably larger VBVs for bleeding additional compressed air from the booster compressor, and the VIGVs may also be modified for closing even further the inlet to the booster compressor for further reducing airflow through the booster compressor. However, this is generally undesirable since it requires additional structural changes to the parent engine, and undesirable pressure and temperature distortions in the compressed airflow channeled to the core engine may be created.

In the exemplary engine described above, the required flow area of the VBVs would have to be increased twice as large as the original flow area for reducing the output shaft horsepower to a substantially zero value for allowing lock-on of the generator to the electrical grid. Substantially zero output shaft horsepower means that amount of horsepower required for overcoming windage losses and other loads of rotating the electrical generator rotor prior to the production of electrical power therefrom. And, of course, the power turbine also provides additional horsepower through the first rotor for powering the booster compressor.

An additional problem associated with operating an aircraft-derived industrial engine for powering an electrical generator occurs during lock-off of the electrical generator when it is electrically disconnected from the power grid. In this situation, the output power of the engine is reduced to a minimum value, and, when the electrical generator is disconnected or locked-off from the power grid, the electrical load on the power turbine is eliminated. If the output shaft horsepower from the power turbine is too large, the power turbine will immediately overspeed, resulting in undesirable booster compressor stall, for example. Accordingly, in the lock-off condition, means must be provided for reducing the horsepower from the output shaft to substantially zero for preventing overspeed of the power turbine and resulting stall of the booster compressor.

Furthermore, during a full power emergency stopcock, the low pressure rotor system including the power turbine and the electrical generator coasts down in speed very slowly relative to the core engine and can cause booster compressor stall. Thus, during unfired rolldown, it is desirable that the power turbine not extract power from the flow field so that the low pressure rotor system decelerates faster for reducing the possibility of booster stall.

OBJECTS OF THE INVENTION

Accordingly, one object of the present invention is to provide a new and improved gas turbine engine for marine and industrial applications.

Another object of the present invention is to provide a gas turbine engine derived from an aircraft gas turbine engine requiring relatively few changes for powering an electrical generator at synchronous speed.

Another object of the present invention is to provide an aircraft derivative gas turbine engine and method of operation for powering an electrical generator at a no-load synchronous speed.

Another object of the present invention is to provide a gas turbine engine having means for preventing rotor overspeed and low pressure compressor stall when powering a generator locking on and off at synchronous speed, and when undergoing a fuel stopcock from high power.

Another object of the present invention is to provide a gas turbine engine including means for preventing booster compressor stall without generating undesirable pressure or temperature distortions from the booster compressor to the core engine compressor.

DISCLOSURE OF INVENTION

An industrial gas turbine engine includes in serial flow relationship a booster compressor, core engine, power turbine, and flow channel, with the power turbine having a first shaft, joined to the booster compressor, and an output shaft, and the flow channel having an outlet. Means for selectively varying flow area of the channel outlet are provided for controlling stall margin of the booster compressor in an exemplary embodiment of the engine and method of operation. The flow area varying means is effective for providing a minimum area of the channel outlet for controlling booster compressor stall margin at least at a synchronous speed associated with powering an electrical generator. In one embodiment, the flow area varying means effects a minimum horsepower from the output shaft for allowing lock-on and lock-off of the electrical generator at synchronous speed. In another embodiment of the invention, the flow area varying means is effective for braking the electrical generator during a full power stopcock rollback.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
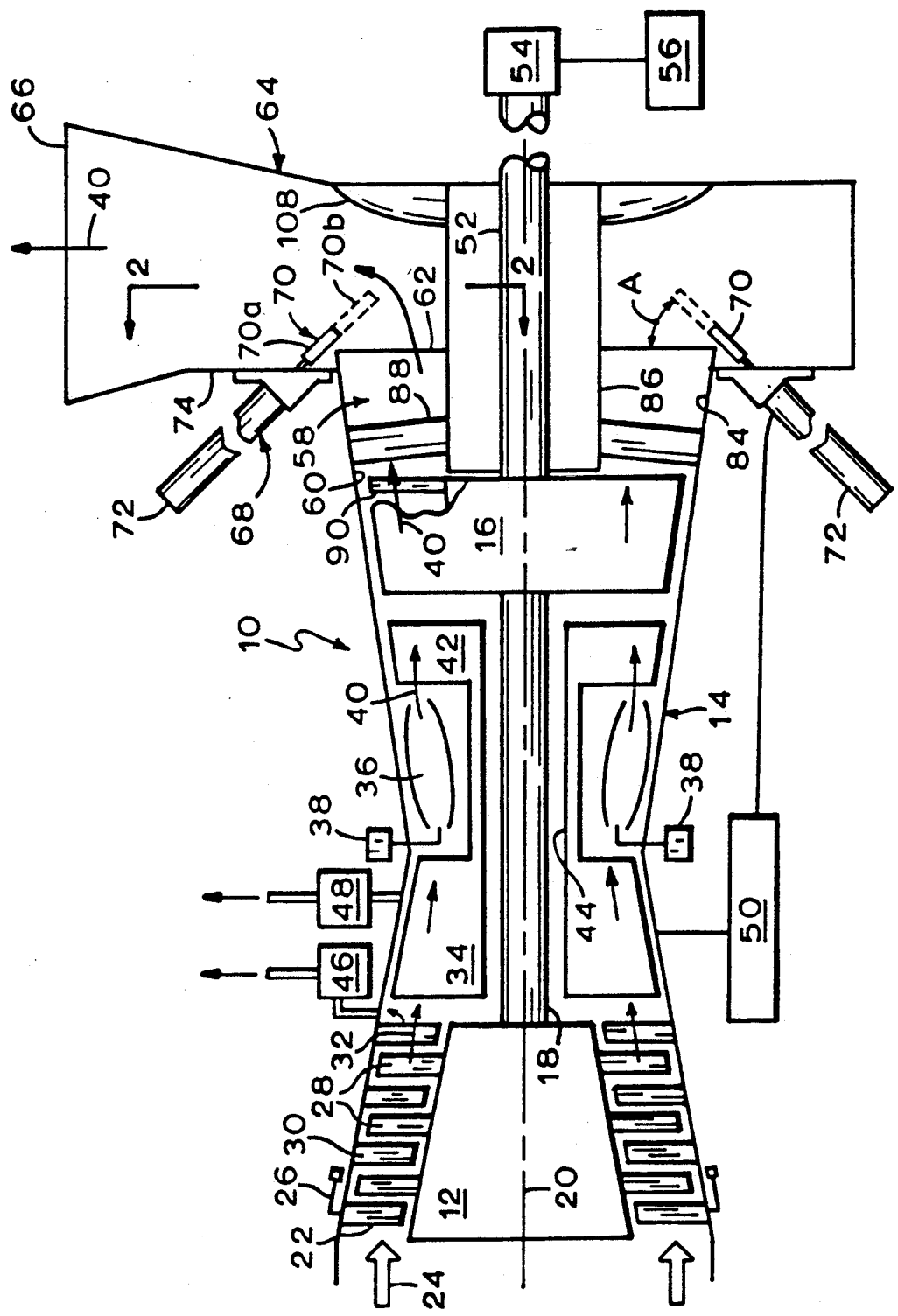
FIG. 1 is a centerline sectional schematic view of an exemplary gas turbine engine having means for varying flow area in accordance with one embodiment of the present invention.

Illustrated in FIG. 1 is an exemplary gas turbine engine 10 derived from a conventional high bypass turbofan gas turbine engine originally designed for powering an aircraft in flight (not shown). Although the engine 10 is an aircraft-derived engine, originally designed engines may also be used. The engine 10 includes in serial flow relationship a conventional low-pressure, or booster, compressor 12, a core engine 14, a low-pressure, or power, turbine 16 having a first rotor shaft 18 conventionally joined to the booster compressor 12 for providing power thereto, all disposed coaxially about a longitudinal centerline axis 20. The engine 10 also includes a plurality of circumferentially spaced conventional booster variable inlet guide vanes (VIGVS) 22 for controlling the amount of inlet airflow 24 admitted to the booster compressor 12. Conventional actuation means 26 are provided for rotating the VIGVs 22 from an open position at about a zero degree angular orientation relative to the inlet airflow 24 for providing substantially unobstructed flow to the booster compressor 12, to a fully closed position at about 40 degrees angular position relative to the inlet airflow 24 for partially obstructing the inlet airflow 24 by providing a reduced, minimum inlet flow area to the booster compressor 12. In the closed position, the VIGVs 22 provide a minimum amount of airflow 24 to the booster 12 for operating the core engine 14.

"Open" and "closed" as used herein simply refers to the conventional range of operation for relatively unrestricted and restricted flow, respectively. Different engine applications will have different open and closed positions, as well as positions therebetween, which still fall within the scope of the present invention as described herein.

The booster compressor 12 includes a plurality of circumferentially spaced rotor blades 28 and stationary vanes 30 disposed conventionally in several rows, for example about four or five rows, with three rows being illustrated. The booster compressor 12 initially compresses the inlet airflow 24 for providing compressed airflow 32 to the core engine 14.

The core engine 14 conventionally includes a high-pressure compressor (HPC) 34 which further compresses the compressed airflow 32 and channels it to a conventional annular combustor 36. Conventional fuel injection means 38 provides fuel to the combustor 36 wherein it is mixed with the compressed airflow for generating combustion gases 40 which are conventionally channeled to a conventional high-pressure turbine (HPT) 42. The HPT 42 is conventionally joined to the HPC 34 by a second rotor shaft 44.

A plurality of circumferentially spaced conventional booster variable bleed valves (VBVS) 46, represented schematically in FIG. 1, is provided for conventionally bleeding a portion of the compressed airflow 32 from the booster compressor 12 to control the amount of compressed airflow channeled to the HPC 34 for matching the operation of the booster compressor 12 to the core engine 14 as is conventionally known. In one embodiment, the compressed airflow 32 channeled through the VBVs 46 is simply dumped overboard, or out from the engine 10, and is not further utilized.

The VBVs 46 are conventionally positioned from a closed position which prevents bleed airflow, to an open, or fully open, position which provides a maximum amount of bleeding of the compressed airflow 32 from the booster compressor 12.

The engine 10 further includes conventional means 48 for bleeding a portion of the compressed airflow 32 channeled through the HPC 34 which is also conventionally known. The HPC bleed means 48 may provide bleed of the airflow being compressed in the HPC 34 at various stages thereof as is Conventionally known, and the airflow so bled may also be simply dumped overboard or used for other conventional purposes in operation of the engine 10.

The engine 10 includes a conventional control means 50 which controls operation of the engine 10 including, for example, operation of the actuation means 26, the VBVs 46, the HPC bleed means 48, and the fuel injection means 38.

The engine 10 as described above is conventional and is substantially identical to the aircraft gas turbine engine from which it is derived except that the conventional fan disposed upstream of the booster compressor 12 has been removed, and the booster compressor 12 has been slightly modified, for example by including new rotor blades at the first several rows thereof for improved operation as an industrial gas turbine engine.

In accordance with one embodiment of the present invention, the engine 10 further includes an output shaft 52 extending downstream from the power turbine 16, in a direction opposite to that of the first shaft 18, which output shaft 52 is directly connected to a conventional electrical generator 54. The generator 54 is conventionally joined to an electrical power grid indicated schematically at 56.

The power turbine 16 is effective for extracting from the combustion gases 40 channeled thereto from the HPT 42 power for rotating the booster compressor 12 through the first shaft 18 and for providing output power to the generator 54 as horsepower through the output shaft 52.

Also in accordance with a preferred embodiment of the present invention, the engine 10 further includes an annular flow channel 58, or conventional diffuser, having an annular inlet 60 disposed in flow communication with the power turbine 16 for receiving the combustion gases 40 channeled therethrough. The diffuser 58 in this exemplary embodiment is a conventional axial diffuser including an annular outlet 62 for discharging the combustion gases 40 into a conventional exhaust assembly 64. The exhaust assembly 64 includes an outlet 66 from which the combustion gases 40 are discharged to the atmosphere.

Also in accordance with the present invention, the engine 10 further includes means 68 for selectively varying flow area of the channel outlet 62 for controlling stall margin of the booster compressor 12. Stall margin is a conventional parameter which is used to indicate the margin of operation of the booster compressor 12 for avoiding undesirably high pressure ratios across the booster compressor 12 at particular flow rates of the airflow 32 therethrough which would lead to undesirable stall of the booster compressor 12 as is conventionally known.

The parent of the gas turbine engine 10 was originally designed for powering an aircraft from takeoff through cruise, for example, thus requiring varying output power from the power turbine 16 at varying rotational speeds thereof. The operation of the power turbine 16 in the parent engine is conventionally coordinated with operation of the core engine 14 for obtaining predetermined coordination of the rotational speeds of the first shaft 18 and the second shaft 44, as well as flow matching of the compressed airflow 32 from the booster compressor 12 to the core engine 14, for example. However, in adapting the parent engine for powering an electrical generator at a synchronous speed such as 3000 rpm, or 3600 rpm, for generating electrical power at 50 Hertz and 60 Hertz, respectively, the power turbine 16, first shaft 18, and output shaft 52 are operated at speeds which have a reduced maximum speed being the synchronous speed.

Accordingly, the engine 10, in order to bring the generator 54 on line, must be operated for increasing the rotational speed of the power turbine 16 and output shaft 52 up to the synchronous speed at which it is maintained in order for locking on the generator 54 to the electrical power grid 56. However, since the engine 10 is basically unchanged from the original parent aircraft engine, operation of the power turbine 16 at the synchronous speed would result in a substantial output shaft horsepower from the output shaft 52 but for the present invention. This is undesirable since prior to lock-on of the generator 54 to the power grid 56, the only loads on the output shaft 52 are those associated primarily with windage and bearing losses of the generator 54 which are relatively small and which may range from about 40 to 500 horsepower in exemplary embodiments. Since the horsepower from the output shaft 52 without the present invention would be substantially larger than the off-line generator load, the power turbine 16 and output shaft 52 would be unrestrained, thus leading to undesirable overspeed and undesirable stalling of the booster compressor 12. In the exemplary engine 10 illustrated in FIG. 1, full power, on-line synchronous running thereof generates about 56000 SHP in the output shaft 52 for operating the generator 54 for generating a corresponding substantial electrical power output to the power grid 56.

One conventional means for reducing horsepower from the output shaft 52 at the off-line synchronous speed would be to open the VBVs 46 to a fully open position for bleeding overboard a portion of the compressed airflow 32 for reducing the flow rate to the core engine 14. With such bleed airflow, the horsepower from the output shaft 52 may be reduced in this exemplary embodiment to about 10,500 SHP which is still substantially too large for maintaining synchronous speed to allow lock-on of the generator 54. A further conventional means for reducing horsepower from the output shaft 52 includes closing the VIGVs 22 from the fully open position having an angular orientation of about 0° relative to the inlet airflow 24 to a fully closed position having an angular orientation of about 40 degrees relative to the inlet airflow 24 for partially reducing the flow area to the booster compressor 12 and partially obstructing the inlet airflow 24. With the VBVs 46 open and the VIGVs 22 closed, output power from the output shaft 52 may be reduced to about 6800 SHP in this exemplary embodiment. Such output power is still unacceptably high for maintaining synchronous speed of the output shaft 52 for obtaining lock-on of the generator 54 to the power grid 56.

In accordance with the present invention, the flow area varying means 68 may be used for controlling the stall margin of the booster compressor 12, and for example, may be used for substantially reducing horsepower from the output shaft 52 at the synchronous speed for maintaining the synchronous speed for allowing lockon of the generator 54 to the power grid 56. The flow area varying means 68 is operable for obtaining a maximum unobstructed flow area at the diffuser outlet 62 for operating the engine 10 at the maximum horsepower from the output shaft 12, i.e. at the on-line synchronous full power operation at 56000 SHP, for example. And, the means 68 is effective for obtaining a minimum flow area at the channel outlet 62 at a minimum horsepower from the output shaft 12 at the synchronous speed, with the minimum horsepower being that amount needed for merely rotating the generator 54 while not generating electrical power therefrom, which basically includes accommodating the windage losses therein.

The flow area varying means 68 is effective for creating the reduced flow area at the diffuser outlet 62 for creating a nozzle which increases velocity of the combustion gases 40 flowable therethrough. This creates a back pressure on the power turbine 16 and unloads the power turbine 16 for basically wasting power by creating thrust which is discharged through the exhaust assembly 64 for reducing horsepower from the output shaft 52. In other words, the flow area varying means 68 is effective for reducing horsepower from the output shaft 52 by converting the energy of the combustion gases 40 from shaft power to waste thrust which is simply discharged through the exhaust outlet 66.

In the exemplary embodiment of the engine 10 illustrated, the maximum flow area of the outlet 62 has a value of about 1800 square inches (11600 cm$^2$). In one embodiment of the engine 10 without the VIGVs 22, the flow area varying means 68 may be configured for obtaining the minimum flow area of the outlet 62 of about 350 square inches (2260 cm$^2$), which is effective for reducing the output shaft horsepower to about 300 SHP, in accordance with one analysis, with the VBVs 46 being open.

In another exemplary embodiment, the flow area varying means 68 is effective for reducing the flow area of the outlet 62, to about 300 square inches (1935 cm$^2$), and with the VBVs 46 being open and the VIGVs being closed the horsepower from the output shaft 52 at the synchronous speed may be reduced even further to about 44 SHP in accordance with yet another analysis.

According to analysis, the reduction in horsepower at the output shaft 52 for the embodiment with the open VBVs 46, and additionally with the closed VIGVs 22, results in about 11500 lbs. (5230 kg) and 8000 lbs. (3640 kg) thrust, respectively, in the combustion gases 40 discharged through the exhaust assembly 64. Accordingly, the flow area varying means 68 is effective for converting horsepower from the output shaft 52 to thrust in the combustion gases 40 channeled through the exhaust assembly 64.

The above-described analytical results are generalizations which have been derived from the exemplary case studies disclosed below in the following two tables. The values in the tables are only representative and have been rounded off.

TABLE 1

(without VIGVs)

| Case | SHP | VBVs | HPC Bleed | Exhaust Area (in$^2$/cm$^2$) | Thrust (lbs/kg) |
|---|---|---|---|---|---|
| 1 | 56500 | Closed | Closed | 1780(11480) | 6300(2860) |
| 2 | 10500 | Open | Closed | 1780(11480) | 2270(1030) |
| 3 | 320 | Open | Open | 345(2225) | 11500(5230) |

TABLE II (with VIGVs)

| Case | SHP | VIGVs | VBVs | HPC Bleed | Exhaust Area (in$^2$/cm$^2$) | Thrust (lbs/kg) |
|---|---|---|---|---|---|---|
| 4 | 56500 | Nominal | Closed | Closed | 1830 (11800) | 6180(2810) |
| 5 | 6800 | Closed | Open | Closed | 1820 (11740) | 1500(680) |
| 6 | 510 | Closed | Open | Open | 315 (2030) | 8000(3640) |
| 7 | 45 | Closed | Open | Open | 305 (1970) | 8300(3770) |

Table I discloses three exemplary analytical case studies for the engine 10 illustrated in FIG. 1 without the VIGVs 22 and operated at a 3600 rpm synchronous speed. The table discloses horsepower (SHP) from the output shaft 52, with Case 1 indicating 56,500 horsepower (SHP) of the output shaft 52 at full load with the VBVS 46 closed, the HPC bleed 48 closed, and a 1780 square inch (11480 cm$^2$) exhaust flow area at the outlet 62, resulting in 6300 lbs (2860 kg) thrust through the outlet 62. Case 2 indicates a reduction in output shaft horsepower to about 10,500 SHP due to the VBVs 46 being conventionally open, the HPC bleed 48 being closed, with a resulting thrust of 2270 lbs (1030 kg). Case 3 indicates a substantial reduction in output shaft horsepower to about 320 SHP with the VBVs 46 being open, the HPC bleed 48 being conventionally open, and the flow area of outlet 62 being reduced to about 345 square inches (2225 cm$^2$), resulting in thrust of about 11500 lbs (5230 kg).

Table II discloses four additional exemplary case studies of the engine 10 including VIGVs 22. In Case 4, the VIGVs 22 are open at a conventional nominal setting and the VBVs 46 and HPC bleed 48 are closed. At 3600 rpm synchronous speed and a maximum outlet flow area of the outlet 62 of about 1830 square inches (11800 cm$^2$), the engine 10 is effective for providing about 56000 SHP at full load with 6180 lbs (2810 kg) thrust in the gases 40 channeled through the outlet 62.

In Case 5, the VIGVs 22 are conventionally closed, the VBVs 46 are open, the HPC bleed 48 is closed, and the outlet 62 has a maximum flow area of about 1820 square inches (11740 cm$^2$), resulting in about 6800 SHP in the output shaft 52 with 1500 lbs (680 kg) thrust.

In Case 6, the VIGVs 22 are closed, the VBVs 46 are open, the HPC bleed 48 is open, and the area of the outlet 62 has been reduced to about 315 square inches (2030 cm$^2$) for generating about 510 SHP in the output shaft 52 with 8000 lbs (3640 kg) of thrust.

In Case 7, the VIGVs 22 are closed, the VBVs 46 are open, the HPC bleed 48 is further open, and the area of the outlet 62 is further reduced to about 305 square inches (1970 cm$^2$) for obtaining about 45 SHP in the output shaft 52 with 8300 lbs (3770 kg) of thrust.

Accordingly, analysis indicates that the flow area varying means 68 is effective for substantially reducing horsepower in the output shaft 52 at the synchronous speed to levels which are low enough for accommodating solely windage and bearing losses of the generator 52 for maintaining the synchronous speed prior to lock-on of the generator 54 to the power grid 56. Cases 3, 6 and 7 indicate that these losses may range from about 45 SHP to about 510 SHP and be accommodated by the corresponding horsepower from the output shaft 52 obtained by reducing the flow area at the outlet 62 from about 1830 square inches (11800 cm$^2$) to about 305 square inches (1970 cm$^2$). Accordingly, the opportunity f or overspeed of the power turbine 16 at the off-line synchronous speed can be eliminated and thus effective stall margin of the booster compressor 12 may be maintained.

Figure 2:
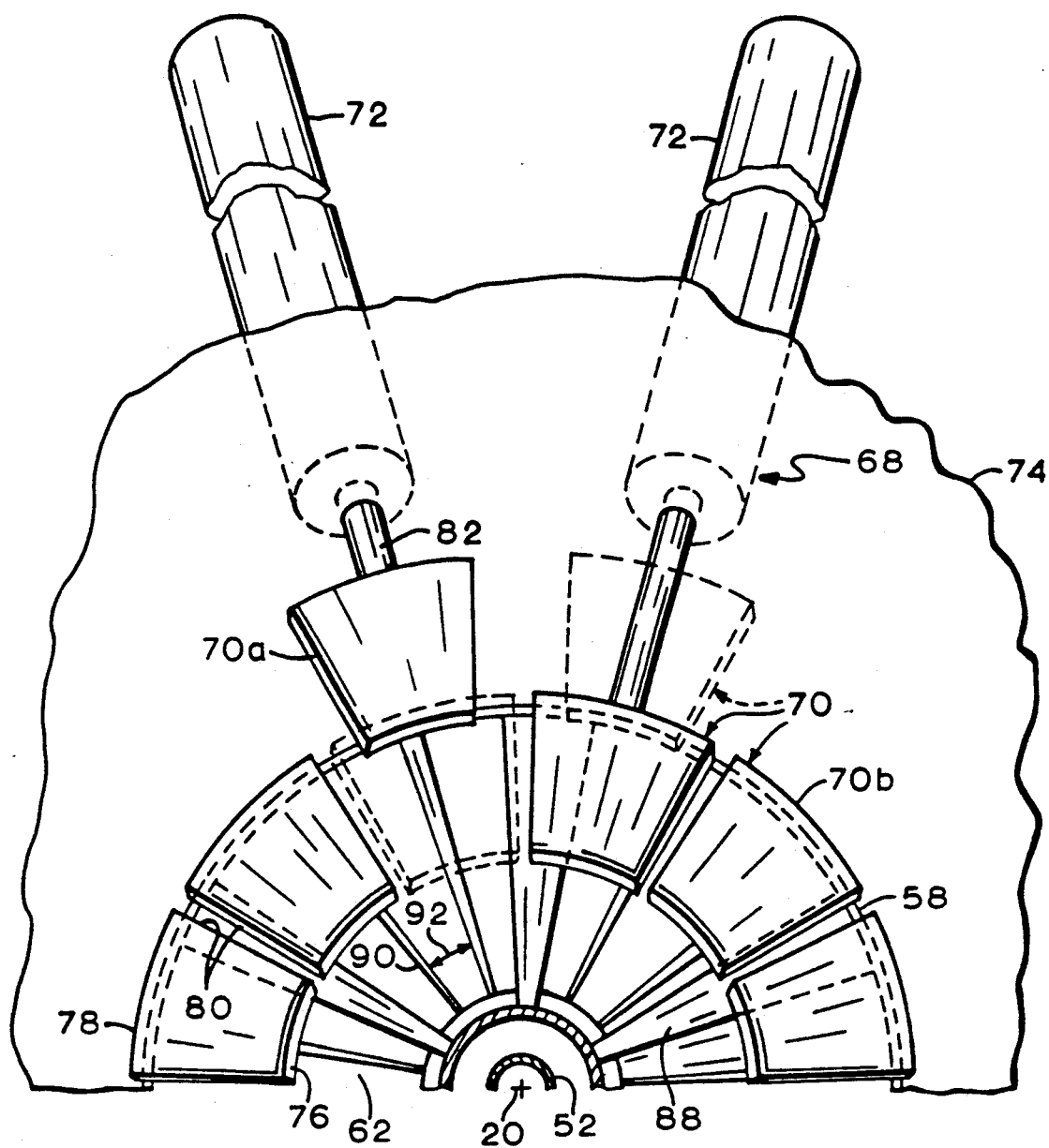
FIG. 2 is an upstream facing end view of the flow area varying means illustrated in FIG. 1 taken along the line 2—2.

The flow area varying means 68 may comprise various embodiments which are effective for controlling the effective flow area of the outlet 62. Illustrated in FIGS. 1 and 2 is one preferred embodiment of the flow area varying means 68. The means 68 comprises a plurality of circumferentially spaced flaps 70 suitably disposed at the channel outlet 62 and positionable at a retracted position indicated at 70a for obtaining the maximum flow area of the outlet 62 and substantially unobstructed flow of the combustion gases 40 flowable through the outlet 62. The flaps 70 are positionable from the retracted position 70a to a deployed position indicated at 70b for obtaining the predetermined minimum flow area of the outlet 62 for partially obstructing the combustion gases 40 flowable through the outlet 62. In FIG. 1, the retracted position 70a is shown in solid line and the deployed position 70b is shown in dashed line. In FIG. 2, the flaps 70 are shown in solid line in the deployed position 70b, except for one flap 70 shown in solid line in the retracted position 70a for clarity.

Although the flaps 70 are positioned in unison in the preferred embodiment, in other embodiments they may be positioned differently from each other as desired for controlling flow area. Furthermore, the flaps 70 are also preferably disposed in either the retracted position 70a or the deployed position 70b, although they may be deployed at intermediate positions therebetween as desired, for example for tailoring, or trimming, operation of the engine 10 relative to the generator 54 for substantially matching the horsepower from the output shaft 52 to any loads, such as windage loads, on the generator 54 at the synchronous speed prior to lock-on of the generator 54 to the power grid 56.

A plurality of conventional linear actuators 72 are conventionally fixedly attached to an annular frame 74 of the exhaust assembly 64 surrounding the diffuser 58 for positioning the flaps 70 between the retracted and deployed positions. In the preferred embodiment of the invention, one actuator 72 is provided for each flap 70 (with only two actuators 72 being shown for clarity) although fewer actuators 72 may be utilized in alternate embodiments with appropriate conventional synchronizing means for deploying and retracting all of the flaps 70 together.

The actuator 72 may be a conventional hydraulic servovalve-type actuator conventionally connected to the engine control 50 for being controlled in coordination with the remainder of the engine 10.

In the preferred embodiment, each of the flaps 70, as illustrated more particularly in FIG. 2, has a generally trapezoidal shape with an arcuate inner edge 76 disposed radially inwardly of an arcuate outer edge 78 with two radially extending side edges 80 extending from the inner to outer edges 76 and 78. Each of the actuators 72 includes an extendable output rod 82 which is conventionally fixedly attached to the flap 70 at the outer edge 78 thereof. In this exemplary embodiment, the output rod 82 is aligned coextensively with the flap 70 and provides translation movement of the flap 70 between the retracted and deployed positions.

As illustrated in FIG. 1, the actuator 72 and the flap 70 are inclined at an acute angle A of about 30 degrees relative to the diffuser outlet 62 for positioning the flap 72 in an inclined downstream position for better accommodating reaction loads from the combustion gases 40 flowable thereagainst.

Referring again to FIG. 2, the flaps 70 are positionable in the retracted position 70a substantially radially removed from the outlet 62 for obtaining the maximum outlet flow area without obstruction which would decrease engine performance. The flaps 70 are also positionable in the deployed position 70b extending substantially fully into the outlet 62 for providing the minimum outlet flow area in the outlet 62 by partially obstructing the combustion gases 40. Although twelve flaps 70 are used in the preferred embodiment, the number of flaps 70 may vary for predeterminedly controlling the flow area of the outlet 62 and for creating waste thrust in the combustion gases 40 for reducing horsepower in the output shaft 52 at the off-line synchronous speed. The number of flaps 70, preferred shapes thereof, spacing therebetween, and extension into the outlet 62 may be selected for each individual application for obtaining the maximum amount of reduction in output shaft horsepower while controlling stall margin of the booster compressor 12.

In the preferred embodiment, the flow channel 58 as illustrated in FIG. 1 comprises a conventional axial, or conic, diffuser having an annular outer flow boundary surface 84 spaced radially outwardly from an annular inner flow boundary surface 86 to define the diffuser 58. The outer surface 84 is relatively straight and inclined at about 8 degrees relative to the engine centerline axis 20 for creating an increase in flow area from the diffuser inlet 60 to the diffuser outlet 62 for providing effective diffusion. Disposed in the diffuser inlet 60 is a plurality of conventional circumferentially spaced rear frame struts 88 which conventionally support the power turbine 16 and output shaft 52 by conventional bearings.

The power turbine 16 conventionally includes a plurality of rotor blade stages including, for example, a plurality of circumferentially spaced last stage rotor blades 90. Adjacent ones of the blades 90 define therebetween a rotor throat 92 of minimum flow area as illustrated in FIG. 2.

The diffuser 58 is provided for reducing the velocity of the combustion gases 40 as they flow therethrough and into the exhaust assembly 64 for obtaining more power output from the engine 10 during power generation operation. In this exemplary embodiment of the engine 10, a relatively short axial diffuser 58 having a predeterminedly low outlet-to-inlet area ratio of about 1.3 is preferred for minimizing the flow area of the outlet 62 for allowing the use of correspondingly relatively small flaps 70. Since this exemplary engine 10 is intended for use for providing peaking electrical power from the generator 54 instead of baseload electrical power, it will operate only periodically and a relatively short diffuser 58 may be utilized without adversely affecting overall operating efficiency of the engine 10.

However, in alternate embodiments of the invention, the engine 10 may be utilized for powering the generator 54 for providing baseload electrical power with the engine 10 being operated for substantial periods of time and not solely at maximum power associated with the peaking electrical power requirements, but from part power to maximum power. In such an embodiment, with the engine 10 operating for periods of time at part power, a conventional longer axial diffuser 58 is preferred for obtaining improved efficiency of the engine 10 at part power operation. In such an embodiment, the area of the outlet 62 would be relatively larger than that associated with the short conic diffuser having the area ratio of about 1.3, thus requiring correspondingly larger flaps 70 for suitably reducing the flow area of the outlet 62 for no-load synchronous speed operation of the engine 10.

In the preferred embodiment of the engine 10, for operation of a peaking power engine, the use of the short diffuser 58 configuration allows the engine 10 to be operated for obtaining choked flow of the combustion gases 40 through at least one of the diffuser inlet 60 and the last stage rotor blades 90 at the maximum output shaft horsepower condition. This allows for increased horsepower from the output shaft 52 than that which would be obtained without operating at choked flow. In a particular embodiment, the diffuser 58 allows operation of the engine for obtaining choked flow at the diffuser inlet 60 and supersonic flow through the rotor throat 92 of the power turbine last stage blades 90 for further increasing the maximum horsepower from the output shaft 52.

Figure 3:
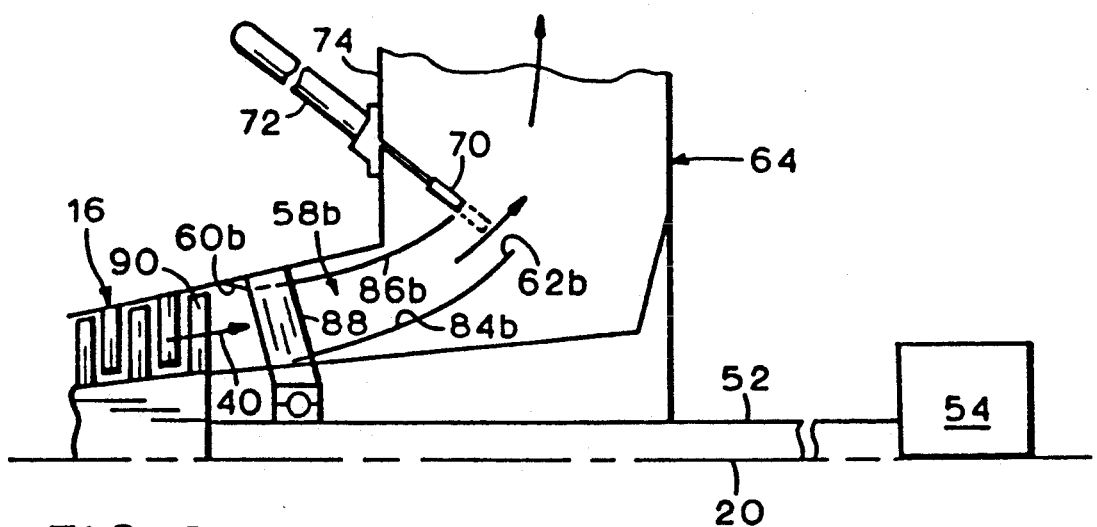
FIG. 3 is an enlarged, transverse sectional view of a downstream portion of the engine shown in FIG. 1 illustrating a first alternate embodiment of the flow area varying means.

Illustrated in FIG. 3 is an alternate embodiment of the present invention wherein the flow channel 58 comprises a conventional radial diffuser 58b having annular outer and inner boundary surfaces 86b and 84b, respectively, for channeling the combustion gases 40 from the power turbine 16. The radial diffuser 58b is arcuate in a transverse plane extending parallel to the engine centerline axis 20 for turning the combustion gases 40 from a primarily axial direction to a radially outward direction. The flaps 70 and actuator 72 are suitably repositioned relative to the outlet 62b of the radial diffuser 58b for being suitably positioned in retracted and deployed positions for controlling the outlet flow area of the outlet 62b.

Figure 4:
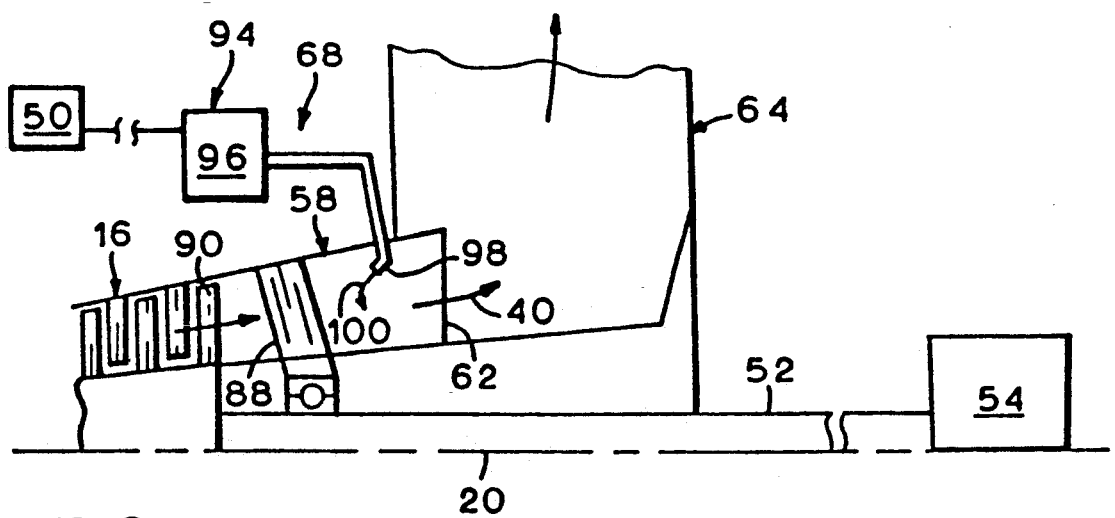
FIG. 4 is an enlarged, transverse sectional view of a downstream portion of the engine shown in FIG. 1 illustrating a second alternate embodiment of the flow area varying means using fluid injection.

Illustrated in FIG. 4 is an alternate embodiment of the flow area varying means 68 which comprises means 94 for injecting a fluid, such as steam, into the diffuser 58,, for example adjacent to the outlet 62, for effectively reducing the flow area of the outlet 62 which is available for flow of the combustion gases 40 for controlling back pressure on the power turbine 16. More specifically, a conventional steam source 96, such as a boiler, is conventionally connected to a plurality of circumferentially spaced steam injectors 98 which are suitably disposed adjacent to the diffuser outlet 62. The steam injection means 94 is conventionally connected to the engine control 50 which controls its operation for injecting steam 100 from the injectors 98 into the diffuser 58 upstream of the outlet 62 at least at the no-load synchronous speed condition for effecting the required minimum outlet flow area. The steam 100 is preferably injected only at the no-load synchronous speed condition, although in alternate embodiments it may be injected at other operating conditions as desired.

Furthermore, the steam 100 is preferably injected in an upstream direction and at a suitable angle to effectively cause the most spoiling or reduction in effective flow area. Preferably, the steam injection pressure is varied to control the degree of spoiling across the diffuser 58, for example, at the outlet 62.

By introducing the steam 100 into the diffuser outlet 62, the steam 100 effectively reduces the area of the outlet 62 which is available for channeling the combustion gases 40. In this way, the velocity of the combustion gases 40 is increased for forming thrust while the power turbine 16 is correspondingly unloaded for reducing horsepower from the output shaft 52 to the minimum value thereof required for no-load synchronous speed operation.

Figure 6:
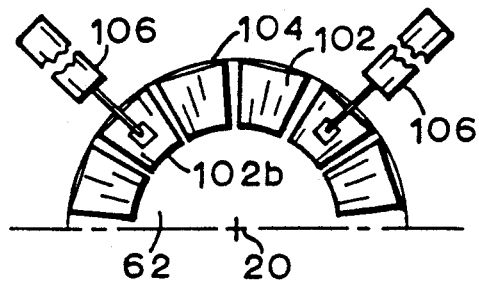
FIG. 6 is an upstream facing end view of a portion of the flow area varying means illustrated in FIG. 5 taken along line 6—6.
Figure 5:
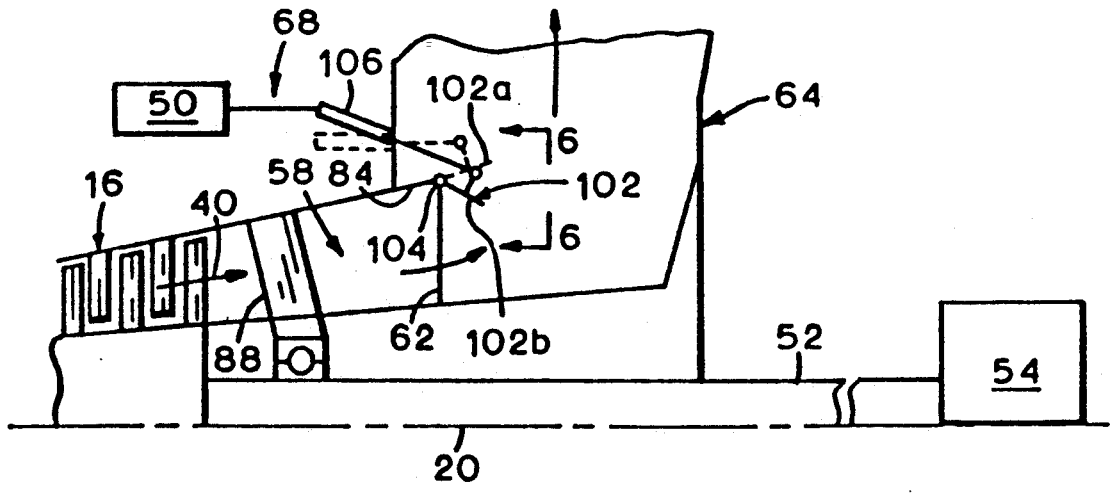
FIG. 5 is an enlarged, transverse sectional view of a downstream portion of the engine shown in FIG. 1 illustrating a third alternate embodiment of the flow area varying means.

Illustrated in FIGS. 5 and 6 is another embodiment of the flow area varying means 68 including a plurality of circumferentially spaced flaps 102 conventionally pivotally connected at their outer edges 104 to the diffuser outer boundary 84 at the diffuser outlet 62. Corresponding conventional actuators 106 (only two of which are shown) are suitably connected to the flaps 102 and to the engine control 50 which controls the operation thereof. The flaps 102 are pivotable about their outer edges 104 from a retracted position 102a shown in dashed line in FIG. 5 which provides for unobstructed flow of the combustion gases 40 through the diffuser outlet 62. The flaps 102 are also positionable in the deployed position 102b illustrated in solid line in FIGS. 5 and 6, which reduces the flow area at the outlet 62. The operation of the flaps 102 is substantially identical to the operation of the flaps 70 described above with respect to FIG. 1 except that the flaps 102 are pivoted for varying flow area. The flaps 102 may take the form of a conventional variable area exhaust nozzle typically utilized in an aircraft gas turbine engine for controlling the area of the outlet 62 as above described.

The flaps 102 may be in the form of a varying conical exhaust assembly, which may discharge the gases 40 directly to the atmosphere without using the exhaust assembly 64.

In the several embodiments of the flow area varying means 68 described above, the area of the diffuser outlet 62 is selectively varied for controlling stall margin of the booster compressor 12. The area may be varied to the maximum flow area for obtaining a maximum horsepower from the output shaft 52 at full load synchronous speed. The area may also be varied to the minimum f low area for controlling the stall margin of the booster compressor 12 at the desired no-load synchronous speed. At the no-load synchronous speed, the minimum flow area is effective for obtaining the minimum horsepower from the output shaft 52 for allowing the generator 54 to be connected to, or locked-on, and disconnected from, or locked-off, from the electrical power grid 56 at no-load synchronous speed without overspeeding the output shaft 52 and stalling the booster compressor 12.

Furthermore, the flow area varying means 68 is preferably utilized in conjunction with closing of the VIGVs 22, opening of the VBVs 46, and opening of the HPC bleed 48 for obtaining additional control of the stall margin of the booster compressor 12 and the HPC 34 while substantially reducing the horsepower from the output shaft 52. Of course, the fuel injection means 38 is also conventionally controlled, for example, for minimizing the energy in the combustion gases 40 during the no-load synchronous speed operation of the engine 10 while maintaining low pressure booster stall margin.

In alternate embodiments of the invention, the engine 10 may not include, for example, the VIGVs 22, in which event, the flaps 70 could be made relatively larger, if required. Similarly, the size of the flaps 70 for obtaining the minimum flow area of the diffuser outlet 62 may be varied in particular design applications depending on the amount of available bleed from the VBVs 46 and from the HPC bleed 48 as desired.

Although the flow area varying means 68 is effective for substantially reducing horsepower from the output shaft 52 at the no-load synchronous speed, the temperature of the combustion gases 40 flowing past the last stage blades 90 in the power turbine 16 increases. For example, such increase in combustion gas temperature in one embodiment is about 300° F. (about 150° C.) which is not significant for the particular embodiment disclosed since the no-load synchronous operation of the engine 10 occurs for a relatively short time to allow the generator 54 to be locked-on to the electrical power grid 56. Once lock-on occurs, the flaps 70 are positioned in the retracted position and the engine 10 is operated at increased output power, for example at maximum output power for generating electricity from the generator 54. When it is desired to disconnect the generator 54 from the power grid 56, the fuel injection means 38 reduces fuel to the engine 10 for decreasing the horsepower from the output shaft 52 and then the flaps 70 are disposed in the deployed position along with closing of the VIGVs 22, opening of the VBVs 46, and opening of the HPC bleed 48,, in this exemplary embodiment, for reducing the horsepower from the output shaft 52 to the minimum value to allow the generator 54 to be locked-off without overspeeding the output shaft 52 and stalling the compressor 12.

A significant advantage of the flow area varying means 68 in accordance with the present invention is that each engine 10 can be tailored or trimmed to a respective no-load synchronous output shaft horsepower condition for accounting for typical engine-to-engine and generator variations and for component deterioration through the lives thereof.

Furthermore, once the no-load synchronous condition is reached, either the engine 10 can be shut down rapidly by reducing booster speed, i.e. first shaft 18 and output shaft 52, and predeterminedly controlling deceleration fuel schedules for the fuel injection means 38 so that the core speed, i.e. second shaft 44, decrease will not cause stall of the booster compressor 12; or, the core engine 14 can be accelerated rapidly to full power as the booster speed is held at the synchronous value. The flaps 70 may be retracted as the power turbine 16 horsepower is fed through the output shaft 52 to the generator 54 into the power grid 56 just prior to acceleration of the core engine and shaft 44.

Since the energy of the combustion gases 40 at the no-load synchronous condition is converted from shaft horsepower to waste thrust, an optional annular blast plate 108 as illustrated in FIG. 1 may be fixedly disposed in the exhaust assembly 64 for accommodating the reaction loads from the thrust in the combustion gases 40. Similarly, the flaps 70 may be conventionally sized for withstanding the thrust forces from the combustion gases 40,, as well as vibration from the exhaust gases, when positioned in the deployed position. When the flaps 70 are retracted, they are removed completely from the direct flow of exhaust gases 40 for providing improved life thereof.

Besides allowing for no-load synchronous speed operation, the flow area varying means 68 may also be utilized for varying the flow area of the outlet 62 during a full power stopcock rollback of the gas turbine engine 10 for braking the generator 54 without stalling the booster compressor 12. In a full power stopcock rollback, substantially immediate stopping of the engine 10 from full power operation is effected by cutting off all fuel to the engine 10 from the fuel injection means 38 (i.e. fuel stopcock) and allowing the entire engine-generator system to decelerate. By reducing the f low area of the outlet 62, loading of the power turbine 16 will be reduced and energy will pass through it instead of powering the booster compressor 12, which will then act as a brake against the rotational inertia of the generator 54.

The engine control 50 preferably includes a predetermined closure schedule for the flow area varying means 68 to control flow of the gases being channeled through the diffuser outlet 62. The closure schedule may be a predetermined constant reduced flow area, or a predetermined varying reduced flow area depending on particular design applications. In all cases, loading of the power turbine 16, and power extraction from the gases 40 channeled therethrough, is thereby reduced. Additionally, either at fuel stopcock or generator load drop, the VBVs 46 are opened to control and hold a maximum operating line of the booster 12 for obtaining maximum work, and therefore, maximum braking from the booster 12.

Furthermore, in the stopcock rollback condition, the free spinning core engine rotor shaft 44 would ordinarily decelerate relatively faster than the power turbine shaft 18 which is connected to the relatively high inertia generator 54. This difference in rotational speed could lead to stall of both the booster compressor 12 and HPC 34 unless a conventional clutch were connected between the output shaft 52 and the generator 54 for decoupling the generator 54 during the rollback. The flow area varying means 68 may be used instead of the clutch in the stopcock rollback condition to allow the booster compressor-power turbine assembly to brake the generator 54 which increases the deceleration of the shaft 18 for reducing the difference in rotational speed with the shaft 44. In the stopcock rollback condition, stall of the HPC 34 may be further avoided by bleeding compressed air from the HPC 34 using the HPC bleed means 48 to reduce its operating line. Bleed may be accomplished at various stages as is conventionally known.

Alternate methods of operating the engine 10 at the stopcock rollback condition include stopcocking fuel flow and at about 90% rated speed of the first shaft 18, dropping the generator load; or, stopcocking fuel flow and dropping electrical load from the generator 54 simultaneously; or, dropping the generator 54 load and at about 110% rated speed of the first shaft 18 stopcocking fuel flow from the fuel injection means 38.

These various methods of operating the engine 10 during a stopcock rollback condition may be evaluated by those skilled in the art for particular engine-generator applications. In all such situations, the flow area varying means 68 is effective for reducing flow area of the diffuser outlet 62 for reducing loading of the power turbine 16 and allowing the energy to pass through the power turbine 16 instead of providing energy to the booster compressor 12 which will then act as a braking device against the inertia of the generator 54. A preferred objective is to keep the operating line of the booster compressor 12 as high as possible without stalling the booster compressor 12 for effecting a maximum braking load to the generator 54.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

More specifically, and for example only, various types of the flaps 70 may be utilized along with various types of actuators 72 including, for example, conventional screw-type actuators. Although the preferred embodiment has been described with respect to a dual rotor gas turbine engine, it may be applied to other engines including single or triple rotor gas turbine engines having power turbines driving both a compressor and an output shaft. Yet further, the flow area varying means 68 may also be used in other types of gas turbine engines having various embodiments of the VIGVs 22, VBVs 46 and/or HPC bleed means 48.

Accordingly, what is desired to be secured by Letters Patent of the United States is the invention as defined and differentiated in the following claims:

1. A gas turbine engine of the marine and land-based industrial (M&I) type for powering a load connected thereto comprising:
   a booster compressor for providing compressed airflow;
   a core engine disposed in flow communication with said booster compressor for receiving said compressed airflow and generating combustion gases;
   a power turbine disposed in flow communication with said core engine for receiving said combustion gases, said power turbine including a first shaft, joined to said booster compressor for rotation therewith, and an output shaft for providing power to said load at a synchronous speed;
   a flow channel having an inlet disposed in flow communication with said power turbine for receiving said combustion gases channeled therethrough and an outlet for discharging said combustion gases as waste thrust;
   an exhaust assembly disposed in flow communication with said flow channel outlet for receiving said combustion gases therefrom, and including an exhaust assembly outlet for discharging said combustion gases; and
   means for selectively varying flow area of said channel outlet for reducing horsepower from said output shaft at said synchronous speed to a minimum output shaft horsepower of about zero, while maintaining a predetermined stall margin of said booster compressor.

2. A gas turbine engine according to claim 1 wherein said output shaft is connectable to an electrical generator and is rotatable at said synchronous speed for powering said generator for generating electrical power to an electrical power grid at said synchronous speed, and said flow area varying means is operable for obtaining a maximum flow area of said channel outlet at a maximum horsepower from said output shaft, and a minimum flow area of said channel outlet at said minimum horsepower from said output shaft at said synchronous speed.

3. A gas turbine engine according to claim 2 further including a plurality of variable area bleed valves for selectively varying bleed flow of said compressed airflow from said booster compressor.

4. A gas turbine engine according to claim 3 wherein said bleed valves are disposed in an open position when said flow area varying means is operated for obtaining said minimum outlet flow area.

5. A gas turbine engine according to claim 4 further including a plurality of variable inlet guide vanes disposed upstream of said booster compressor for selectively controlling airflow channeled thereto.

6. A gas turbine engine according to claim 5 wherein said inlet guide vanes are disposed in a closed position for providing a minimum amount of airflow to said booster compressor when said flow area varying means is operated for obtaining said minimum outlet flow area.

7. A gas turbine engine according to claim 2 wherein said flow varying means comprises a plurality of circumferentially spaced flaps disposed at said channel outlet and positionable from a retracted position, for obtaining said outlet maximum area and unobstructed flow of said combustion gases flowable through said outlet, to a deployed position for obtaining said outlet minimum area for partially obstructing said combustion gases flowable through said outlet.

8. A gas turbine engine according to claim 7 further including a plurality of actuators for positioning said flaps from said retracted to said deployed positions.

9. A gas turbine engine according to claim 8 wherein each of said flaps has a generally trapezoidal shape with an arcuate inner edge disposed radially inwardly of an arcuate outer edge.

10. A gas turbine engine according to claim 9 wherein said flaps are joined to said actuators for pivotal movement about said outer edges thereof between said retracted and deployed positions.

11. A gas turbine engine according to claim 9 wherein said flaps are joined to said actuators for translation movement between said retracted and deployed positions.

12. A gas turbine engine according to claim 11 wherein said flow channel comprises an annular diffuser and said channel inlet is an inlet of said diffuser disposed in flow communication with said power turbine, and said channel outlet is an outlet of said diffuser for discharging said combustion gases to said exhaust assembly.

13. A gas turbine engine combustor according to claim 12 wherein said flow channel comprises a radial diffuser.

14. A gas turbine engine according to claim 12 wherein said flow channel comprises an axial diffuser.

15. A gas turbine engine according to claim 12 further including a plurality of circumferentially spaced struts disposed in said diffuser inlet, and wherein said power turbine includes a plurality of circumferentially spaced last stage rotor blades, said engine being configured for operating at choked flow through at least one of said diffuser inlet and said last stage rotor blades at said maximum output shaft horsepower condition.

16. A gas turbine engine according to claim 15 wherein said engine is configured for obtaining choked flow at said diffuser inlet and supersonic flow through last stage rotor blades.

17. A gas turbine engine according to claim 16 wherein said diffuser has an area ratio representing flow area of said diffuser outlet over flow area of said diffuser inlet, and said area ratio being about 1.3.

18. A gas turbine engine according to claim 17 further including a plurality of variable area bleed valves for selectively varying bleed flow of said compressed airflow from said booster compressor.

19. A gas turbine engine according to claim 18 wherein said bleed valves are disposed in an open position when said flow area varying means is operated for obtaining said minimum outlet flow area.

20. A gas turbine engine according to claim 19 further including a plurality of variable inlet guide vanes disposed upstream of said booster compressor for selectively controlling airflow channeled thereto.

21. A gas turbine engine according to claim 20 wherein said inlet guide vanes are disposed in a closed position for providing a minimum about of airflow to said booster compressor when said flow area varying means is operated for obtaining said minimum outlet flow area.

* * * * *